US007269737B2

(12) United States Patent
Robinson

(10) Patent No.: US 7,269,737 B2
(45) Date of Patent: Sep. 11, 2007

(54) SYSTEM AND METHOD FOR BIOMETRIC AUTHORIZATION FOR FINANCIAL TRANSACTIONS

(75) Inventor: Timothy Robinson, Herndon, VA (US)

(73) Assignee: Pay By Touch Checking Resources, Inc., San Francisco, CA (US)

( * ) Notice: Subject to any disclaimer, the term of this patent is extended or adjusted under 35 U.S.C. 154(b) by 623 days.

(21) Appl. No.: 10/251,305

(22) Filed: Sep. 20, 2002

(65) Prior Publication Data

US 2003/0061172 A1 Mar. 27, 2003

Related U.S. Application Data

(60) Provisional application No. 60/324,229, filed on Sep. 21, 2001.

(51) Int. Cl.
*H04L 9/00* (2006.01)
*H04K 1/00* (2006.01)
(52) U.S. Cl. ........................... 713/186; 340/582
(58) Field of Classification Search ................. 713/186, 713/200; 382/115; 702/179; 235/382; 705/64, 67; 340/5.52, 5.53, 5.82–5.84
See application file for complete search history.

(56) References Cited

U.S. PATENT DOCUMENTS

| 4,230,214 A | 10/1980 | Cortez |
| 4,359,631 A | 11/1982 | Lockwood et al. |
| 4,553,222 A | 11/1985 | Kurland et al. |
| 4,716,593 A | 12/1987 | Hirai et al. |
| 4,879,747 A | 11/1989 | Leighton et al. |
| 4,915,205 A | 4/1990 | Reid et al. |
| 4,995,081 A | 2/1991 | Leighton et al. |
| 5,042,073 A | 8/1991 | Collot et al. |
| 5,067,162 A | 11/1991 | Driscoll, Jr. et al. |
| 5,086,389 A | 2/1992 | Hassett et al. |

(Continued)

FOREIGN PATENT DOCUMENTS

EP 0598469 A2 5/1994

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Kambiz Abdi
*Assistant Examiner*—Nancy T. Le
(74) *Attorney, Agent, or Firm*—Pepper Hamilton, LLP

(57) ABSTRACT

The present invention is a system and method of biometric-based identity verification for authorizing financial transactions between a consumer and a merchant, said system comprising distributed processing to facilitate biometric matching and various types of financial transactions to facilitate said system's integration into current financial networks. System users register at least one biometric identifier, personal and/or business identity-verifying data, and financial account information. A user presents a biometric sample obtained from the user's person and the user's system ID number to conduct financial transactions. This data is used to authenticate the user's identity and authorize transfer of funds from the user's registered financial account to the designated recipient's account by matching the presented transaction biometric with at least one registered biometric template and without the use of a man-made financial account token or identity token.

21 Claims, 12 Drawing Sheets

U.S. PATENT DOCUMENTS

| | | |
|---|---|---|
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime .......................... 235/379 |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner ..................... 382/115 |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |
| 5,594,806 A | 1/1997 | Colbert ....................... 382/115 |
| 5,598,474 A | 1/1997 | Johnson |
| 5,602,933 A | 2/1997 | Blackwell et al. .......... 382/116 |
| 5,613,012 A | 3/1997 | Hoffman et al. ............ 382/115 |
| 5,615,217 A | 3/1997 | Horne et al. ................ 371/22.3 |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. ............. 382/115 |
| 5,745,598 A | 4/1998 | Shaw et al. ................. 382/209 |
| 5,751,973 A | 5/1998 | Hassett |
| 5,764,789 A | 6/1998 | Pare, Jr. et al. ............. 382/115 |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. ............. 382/115 |
| 5,805,082 A | 9/1998 | Hassett |
| 5,805,719 A | 9/1998 | Pare, Jr. et al. ............. 382/115 |
| 5,832,464 A | 11/1998 | Houvener et al. |
| 5,838,812 A | 11/1998 | Pare, Jr. et al. ............. 382/115 |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. ............... 705/39 |
| 5,872,834 A | 2/1999 | Teitelbaum |
| 5,893,075 A | 4/1999 | Plainfield et al. |
| 5,897,616 A | 4/1999 | Kanevsky et al. |
| 5,910,988 A | 6/1999 | Ballard |
| 5,914,472 A | 6/1999 | Foladare et al. ............. 235/380 |
| 5,927,544 A | 7/1999 | Kanoh et al. |
| 5,930,804 A | 7/1999 | Yu et al. ..................... 707/104 |
| 5,933,816 A | 8/1999 | Zeanah et al. ................ 705/35 |
| 5,943,423 A | 8/1999 | Muftic |
| 5,982,914 A | 11/1999 | Lee et al. .................... 382/124 |
| 5,984,366 A | 11/1999 | Priddy .......................... 283/72 |
| 6,009,411 A | 12/1999 | Kepecs |
| 6,012,039 A | 1/2000 | Hoffman et al. ............... 705/14 |
| 6,028,950 A | 2/2000 | Merjanian |
| 6,032,137 A | 2/2000 | Ballard |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,160,903 A * | 12/2000 | Hamid et al. ................ 382/115 |
| 6,161,059 A | 12/2000 | Tedesco et al. |
| 6,161,090 A | 12/2000 | Kanevsky et al. |
| 6,167,517 A | 12/2000 | Gilchrist et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,202,055 B1 | 3/2001 | Houvener et al. |
| 6,222,914 B1 | 4/2001 | McMullin |
| 6,230,148 B1 | 5/2001 | Pare, Jr. et al. ................ 705/40 |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. ................ 705/39 |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 * | 11/2001 | Gennaro et al. ............. 713/186 |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,157,314 A1 | 6/2002 | Loftus |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze |
| 6,498,970 B2 | 12/2002 | Colmenarez et al. |
| 6,507,912 B1 * | 1/2003 | Matyas et al. ................ 713/200 |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |
| 6,539,282 B2 | 3/2003 | Metcalf et al. |
| 6,542,874 B1 | 4/2003 | Walker |
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare et al. |
| 6,591,224 B1 * | 7/2003 | Sullivan et al. ............. 702/179 |
| 6,594,376 B2 | 7/2003 | Hoffman et al. |
| 6,598,023 B1 | 7/2003 | Drummond et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |

| | | |
|---|---|---|
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare et al. |
| 6,685,088 B1 | 2/2004 | Royer et al. |
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 * | 4/2004 | Schneider et al. .......... 235/382 |
| 6,745,327 B1 | 6/2004 | Messing |
| 6,748,365 B1 | 6/2004 | Quinlan et al. |
| 6,755,344 B1 | 6/2004 | Mollett et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |
| 6,854,642 B2 | 2/2005 | Metcalf et al. |
| 6,865,544 B1 | 3/2005 | Austin |
| 6,871,287 B1 | 3/2005 | Ellingson |
| 6,873,969 B2 | 3/2005 | Stone et al. |
| 6,886,742 B2 | 5/2005 | Stoutenburg et al. |
| 6,892,302 B2 | 5/2005 | Wheeler et al. |
| 6,928,546 B1 | 8/2005 | Nanavati et al. |
| 6,935,559 B2 | 8/2005 | Mollett et al. |
| 6,983,160 B2 | 8/2005 | Oono |
| 6,959,381 B2 | 10/2005 | Wheeler et al. |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Maritzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0144956 A1 | 7/2003 | Yu et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |
| 2005/0165700 A1 | 7/2005 | Karthik |
| 2005/0251688 A1 | 11/2005 | Nanavati et al. |

FOREIGN PATENT DOCUMENTS

| | | |
|---|---|---|
| EP | 0762261 A2 | 3/1997 |
| JP | 358044583 A | 3/1983 |
| WO | WO99/47989 A1 | 9/1999 |
| WO | WO 01/20525 A1 | 3/2001 |

OTHER PUBLICATIONS

Lawrence Aragon. Show me some ID. PC Week Online (http://www.zdnet.com/pcweek/news/0112/12bio.html) Jan. 1998.

Gerald Lazar. Agencies Scan Biometrics for Potential Applications. FCW.com (http://www.fcw.com/pubs.fcw.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http://www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty/jhicks/acct5544/present/ddeverea.htm. Apr. 1997.

VAULT FAQs. http://www.ImagineNation.com/Xanadu/Vault. Jun. 1997.

John Daugman. The Scientific Basis for Iris Recognition. http://www.iriscan.com/basis.htm. Dec. 1998.

Electronic Banking 1. http://www.sjb.co.uk/eb 1 .html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wvu.edu/~wise/biometric/index.htm, including Dec. 9, 2002 Proposal and May 5, 2003 Team Report.

Office of NYS Attorney General Eliot Spitzer. Financial Giant Joins Fight Against Online Gambling. Press Release. http://www.oag.state.ny.us/press/2002/jun/jun14a_02.html. Jun. 2002.

Zions Bank. Cards for Any Business Occasion. http://www.zionsbank.com/bank_cards.jsp?leftNav=bf_bfinance&topNav=bfinance, 2004.

ABSA. Purchasing Credit Card. http://www.absa.co.za/Corporate/0,2999,2210,00.html, Apr. 2005.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20, Apr. 2005.

University of Wisconsin—Green Bay. Purchasing Department: Purchasing Card. http://www.uwgb.edu/Purchasing/purchasingCard/procurement07.htm, 2001.

Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.

University of Denver. Purchasing Card User Guide. http://www.du.edu/purchasing/purcard.html#2.%20HOW%20DOES%20THE%20CARD%20WORK?, 2004.

Williams College Controller's Office. Purchasing Card Procedures. http://www.williams.edu/admin/controller/pcard.html#whatis. Jan. 2005, Apr. 2005.

Arizona State University. The Purchasing Card: A Guide for Users. http://www.asu.edu/purchasing/pdf/purchcard.pdf. Jan. 2005.

Washington Post—For Dining In, Security Is the Order of the Day; Post 9/11 Concerns Thwarting Deliverymen: [Final Edition], 2004. MophoTouch™—Multi-Application Finger Identification in the Palm of Your Hand, Sagem Morpho, Inc., 1999.

Video Insight. http://www.video-insight.com/dvr221.htm, 2004.

TMCnet. Cernium Installs Perceptrak Behavrior Recognition Software In Public Parking Garage In Yonkers. http://www.tmcnet.com/usubmit/2003/Dec/1021669.htm. Dec. 2003.

City of Aspen. Parking. http://www.aspenpitkin.com/depts/61/payanddisplay.cfm, 2005.

SmartCity. SmartCity Card Solutions. http://www.coinamatic.com/coinamatic_group/html/apartment_laundry_services/smartcity/Products/p4.html, 2002.

TranCore. TransCore Access Control System First to Successfully Combine Biometrics and RFID. http://www.transcore.com/news/news050314.htm. Mar. 2005.

James P. Holmes et al. A Performance Evaluation of Biometric Identification Devices. Sandia Report. Jun. 1991.

IBM Technical Disclosure Bulletin, Title: selective receipt of document elements in an electronic mail system, Issue No. 429, TDB-ACC-NO: NNRD429177, Jan. 2000, UK.

George I. Davida, Yair Frankel, Brian J. Matt, "On Enabling Secure Applications Through Off-Line Biometric Identification," *sp*, p. 0148, 1998 IEEE Symposium on Security and Privacy, 1998.

\* cited by examiner

SYSTEM AND METHOD FOR BIOMETRIC AUTHORIZATION FOR FINANCIAL TRANSACTIONS

CROSS REFERENCE TO RELATED APPLICATIONS

This application claims priority benefit under 35 U.S.C. § 119(e) from provisional application No. 60/324,229, filed Sep. 21, 2001. The No. 60/324,229 provisional application is incorporated by reference herein, in its entirety, for all purposes.

INTRODUCTION

This application relates generally to financial payments. More particularly, the present invention relates to a tokenless system and method for authorization of financial transactions through a shared database using a biometric and identification number (ID) for identification.

BACKGROUND OF THE INVENTION

Current methods of point-of-sale (POS) financial payments force a consumer to possess and present some type of man-made token in order to make a purchase. The simplest financial token is cash, wherein the token, itself, has value. More sophisticated financial tokens include checks, credit cards, debit cards, and value cards. These tokens link their owners with financial accounts, wherein either the owner has deposited cash or has promised to deposit cash in the future.

There are various problems with these tokens. One, they can easily be lost, stolen, or fraudulently reproduced, leaving the token's owner vulnerable to financial loss. Two, they are expensive for financial institutions to create and eventually those fees get passed on to the token owner. Three, these tokens are inconvenient to carry. If a consumer wishes to make any type of purchase, they are forced to carry one or more of these tokens in order to do so. In addition, whether the token is a check, card, or cash, the owner is still forced to carry it in some type of book or wallet, adding to the owner's everyday carry load. Four, although tokens such as credit and debit cards are thin and rather small, which aides their convenience to carry, they can become scratched, cracked, broken, or the numbers on them may become unreadable, leaving the consumer without access to the financial account represented by that token. Five, because of prevalent fraud, merchants often require consumers who present a check or card to present identity verifying information such as a photo ID in addition to the token representing access to a financial account in order to verify that the person presenting the token is its rightful owner. This adds time and expense to the payment process for the merchant.

Tokens, specifically credit and debit cards, have revolutionized the way consumers shop and have given consumers more financial protection and freedom. More people today who carry credit and/or debit cards instead of cash do so for convenience or funds security purposes. However, despite their size and security advantages, the consumer is still forced to carry a different token for each account, is still forced to find and present that token during a purchase, and is often required to present additional photo identification to verify that they are, indeed, the account holder of the presented token. The token-based financial system, although it works, is still not as secure or convenient as other forms of account presentation could be.

Alternative solutions to the above-described systems include a token-based financial access system combined with a personal identification number (PIN). This is a more secure manner of accepting and processing these financial account tokens but is no more convenient than the original token-based system because it still requires the account owner to carry a token. Another proposed security improvement to the token-based financial access system are smartcards, or tokens equipped with a silicon chip, which record the owning consumer's biometric or PIN and require the consumer to present a biometric or PIN when they use the token. Again, this is a more secure form of the token-based system, yet it provides no more convenience to the consumer. An added downside to the smartcard is its cost of production, which is nearly $3 to $5 per card. And although smart cards are an improvement of the more widely used magnetic token, they are still token-based and are still subject to all factors involved in using a token, including the risk of loss, theft, or counterfeit. What would improve the security, convenience, and cost effectiveness of financial account access while addressing the inherent problems of the token-based system is a tokenless financial access system.

Alternative tokenless financial transaction systems have also been proposed in U.S. Pat. Nos. 5,613,012, 5,615,217, 5,838,812, 5,870,723, 6,230,148, and 6,269,348. However, the systems proposed in these patents are problematic for two main reasons: 1) because they are inefficient in the manner they allocate the work load of the biometric comparison and matching during an identity verifying process and 2) because they do not include functions currently used in credit transactions.

Comparing and matching biometric information at a central database, as these systems propose, requires a powerful central server to perform the matching function of numerous simultaneous transactions. Such a system seems inefficient when the transaction devices that the proposed biometric transaction readers would be linked to have so much unused processing power. By distributing the matching function to various local devices (POS electronic cash registers and other POS transaction devices), the workload on the central database would be reduced, providing quicker, more efficient transactions with inexpensive, already existing devices.

Similarly, a system that only provides a sale function without providing for other important transactions that currently exist in the credit world, such as credit, void, and force, is incomplete and requires merchants to perform such transactions through token-based procedures, a process that not only reintroduces the previously addressed problems of the token but also weakens the significance of the system.

Considering the inconvenience and vulnerability associated with the token-based prior art of financial payments and due to the inefficient and incomplete methods of current biometric-based financial payment systems, what is needed is a system and method financial authorization and transactions that is tokenless, that is secure, that offers the full functionality of current token-based financial payment systems, and that distributes the processing of biometric samples to the point of sale.

SUMMARY OF THE INVENTION

It is therefore, an aspect of the present invention to offer merchants and consumers a convenient and secure way to conduct various types of financial transactions with the use of a biometric read (such as a fingerprint) and system ID (SID) number entry and without the use of any identity-verifying or monetary-representative tokens.

The system of the invention comprises registration of a plurality of merchants, employees, and consumers so that these parties may conduct enrollment, transaction, and account access functions within the system.

A merchant enrolls in the system by providing merchant financial account information and merchant identity verifying information in order to enroll consumers and employees into the system, perform various financial transactions, and perform account maintenance functions.

A consumer enrolls into the system by providing identity-verifying information, a biometric sample, a SID number, and one or more sets of financial account information. Once enrolled in the system, consumers may use the system in order to perform financial transactions, conduct system account maintenance, change account parameters, and verify the consumer's identity or age, by simply presenting a biometric and SID at a registered, properly-equipped station.

System access, identity verification, and financial transactions are approved within the system if the consumer's biometric read is matched with a consumer's enrollment biometric read stored in that consumer's account and if the system access meets preset parameters. An example of such a parameter might be, but should not be limited to, the accessed account not containing negative information. System access approval, whether the access is for maintenance or transaction purposes, is granted automatically by the central database or local device.

It is also an aspect of the present invention to provide registered consumers and merchants with a wide range of financial transaction abilities, specifically sale transactions, authorization transactions, post-authorization transactions, void transactions, void re-add transactions, credit transactions, and force transactions.

These and other aspects of the present invention will become apparent to those skilled in the art by a review of the specification that follows.

Although a number of salient features of the present invention have been described above, the detailed description that follows provides a more detailed exposition of additional features of the invention as it is embodied in various forms.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and termninology employed herein are for the purposes of description and should not be regarded as limiting.

BRIEF SUMMARY OF THE DRAWINGS

Additional objects and advantages of the present invention will be apparent in the following detailed description read in conjunction with the accompanying drawing figures.

DETAILED DESCRIPTION OF THE EMBODIMENTS

An embodiment of the present invention is a system and method for authorization of a financial transaction using a biometric sample and ID number.

Figure 1:
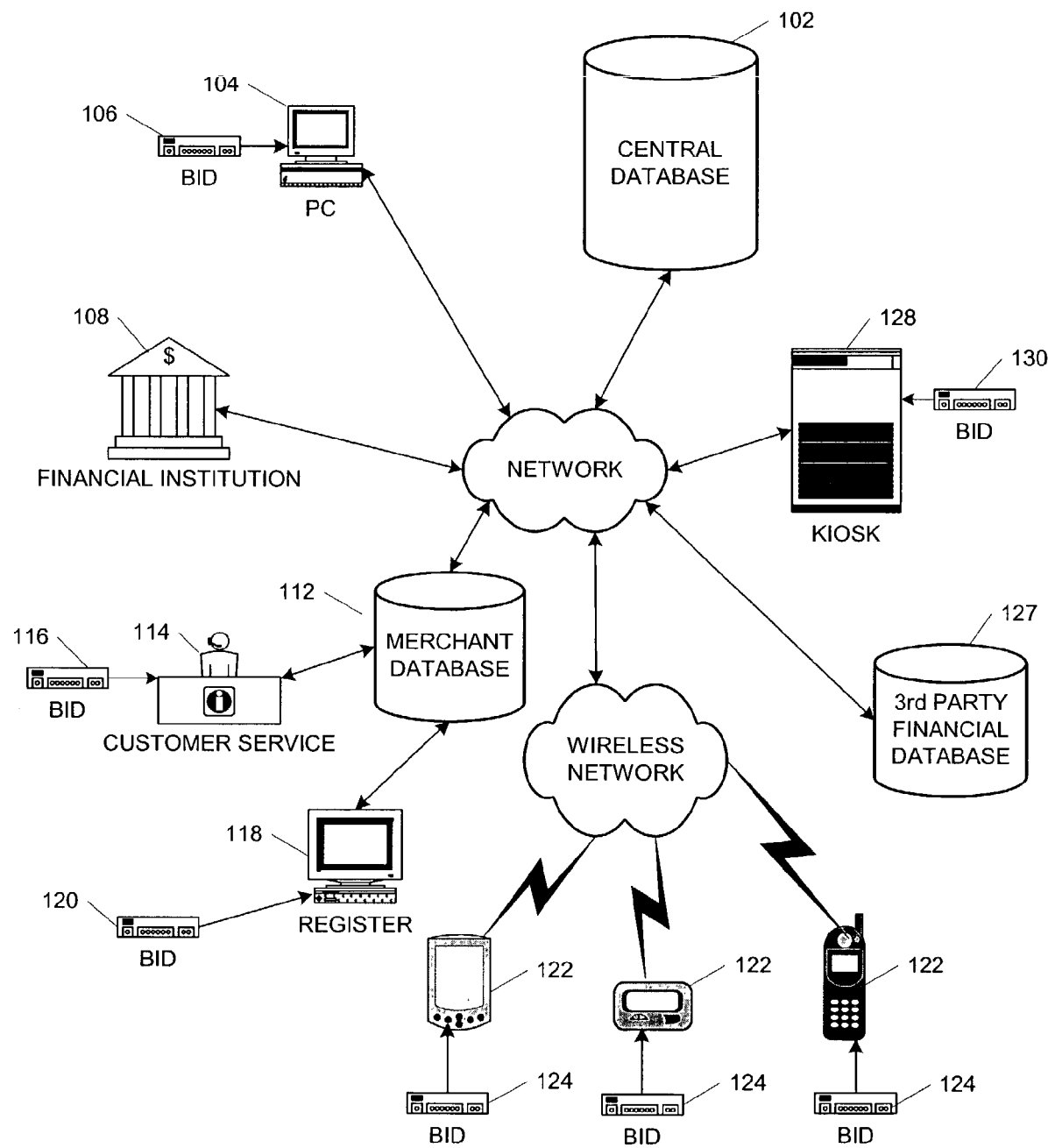
FIG. 1 illustrates a general architecture of a system for biometric authorization for financial transactions according to an embodiment of the present invention.

Referring to FIG. 1, a general architecture overview of a system for biometric authorization of financial transactions according to an embodiment of the present invention is illustrated. One aspect of the system embodiment of the invention is the central database 102, wherein consumer system accounts, merchant system accounts, employee system accounts, and various other accounts and databases are held.

Accounts within the system's central database are shared across a plurality of enrolled merchants. Additionally, in an alternate embodiment of the present invention, accounts are "marked" to denote account status. By way of illustration and not as a limitation, accounts may be unmarked, marked partial enrollment, marked warning, or marked negative. An unmarked account indicates an account with no history of fraudulence in the system. An account marked partial enrollment indicates the account owner must complete enrollment into the system before the account owner is entitled to access that account. An account marked warning indicates an account with possible fraudulent activity in the system. An account marked negative indicates an account with fraudulent activity in the system.

Consumer accounts comprise at least one system identification number (SID) and other information useful for authenticating a consumer, associating a consumer with a financial account, and completing transactions. By way of illustration and not as a limitation, a consumer account may comprise consumer's government identification number(s) and corresponding state(s) of issue, home address, and a telephone number; one or more biometric sample; one or more financial account (e.g. checking, credit, or value); and a consumer may choose a SID from any of the previously listed numbers, may create a SID, provided the SID is unique to the central database 102, or may choose from system suggested ID numbers.

Merchant accounts comprise information useful for authenticating a merchant, associating a merchant with a financial account, and completing transactions. By way of illustration and not as a limitation, a merchant account may comprise a SID, merchant location, and a phone number; a list of terminal ID numbers (TIDs) of the terminals designated to perform system functions; one or more financial accounts; and enrollment and transaction approval/decline parameters.

Employee accounts comprise information useful for authenticating an employee and completing transactions. By way of illustration and not as a limitation, an employee account may comprise a government ID number, a home address, and a telephone number; one or more biometric sample; a SID; and employee system access parameters.

Again referring to the structure of the general architecture overview of a system for biometric authorization of financial transactions, the invention's central database 102 is connected to a network, such as, but not limited to, the Internet. As illustrated in FIG. 1, this network is connected to a merchant database 112 registered with the system and a financial institution 108. As would be apparent to those skilled in the art of the present invention, other entities could perform the functions of merchant database 112 and the financial institution 108 without departing from the scope of the present invention. For example, some or all of the functions of these two entities could be performed by the central database 102.

In an embodiment of the present invention, the merchant database 112 stores various system accounts, communicates enrollment and transaction information to central database 102. In another embodiment, the merchant database 112 further comprises connections to at least one transaction register 118 with a built-in biological identification device (BID) or with connections to a peripheral device with BID capabilities 120. By way of illustration and not as a limitation, the transaction register may be an electronic cash register (ECR) or other POS device. In the description of the embodiments that follow, the BID comprises a fingerprint identification device, however this is not meant as a limitation. Other BIDs may be utilized in the present invention without departing from its scope. For example, the BID may be a voiceprint reader, an iris recognition device, or any other type of biological identification device known in the art.

In an alternate embodiment, transaction register 118 is used for a number of duties, including but not limited to communicating enrollment and transaction information to the merchant database 112, and communicating enrollment and transaction information to central database 102. In yet another embodiment, merchant database 112 comprises connections to at least one customer service computer 114 with BID capabilities 116. In this embodiment, customer service computer 114 communicates enrollment and transaction information to the merchant's local database 112 and communicates enrollment and transaction information to the system's central database 102.

In an embodiment of the present invention, financial institution 108 holds any number of merchant financial accounts and consumer financial accounts and communicates with central database 102 regarding enrollment and transaction information. In another embodiment of the present invention, a merchant's financial account(s) and a consumer's financial account(s) are held at different financial institutions. In this embodiment, the system comprises connections to all financial institutions wherein said accounts are held.

In an alternate embodiment of the present invention, the system further comprises a computer 104; a wireless device 122, such as a cell phone, personal data assistant, or pager; a third party financial database 127, such as SCAN, Telechek, Equifax, or VISAnet; and a kiosk 128.

Party enrollment into the invention's system may be conducted through a registered merchant's local system. A local system is defined here as a merchant's system of connected information processors, including but not limited to the merchant's local database(s) 112, transaction processing register(s) 118, and merchant computer(s) 114. A system kiosk 128 might also be considered part of said local system if it is so configured and integrated into said local system.

Parties interested in enrolling in the invention's system further have the option to pre-enroll, that is provide a partial enrollment, by providing only a portion of the required enrollment information, for the invention's services via a computer 104, a kiosk 128, or a wireless device 122, which is connected to a network, preferably but without limitation the Internet, which is connected to the invention's central database 102. Businesses may also pre-enroll employees for consumer accounts within the system. In doing so, a business might register with the system's central database a list of employees, an employee number for each employee, or any other information that an employee might be willing to share for pre-enrollment purposes. Merchants might also pre-enroll employees for employee accounts within the system in the same manner as described in the above business pre-enrollment description.

Other forms of pre-enrollment may include registering with the invention's central database purchased, or acquired, database information that might supply the system with various individual's information. Said information could be easily entered into the central database of the present invention so that when a consumer whose information was recorded in one of those databases wants to enroll in the system of the invention, some or all of that information contained within said purchased or acquired database would already be available within the system and would not need to be entered at the time of enrollment, thus saving time for both the consumer and the merchant during enrollment.

Financial transactions are conducted within the system through a number of devices including but not limited to a customer service center computer 114 with attached BID 116 or a transaction processing register 118 with attached BID 120. In another embodiment, the system is configured to conduct financial transactions through remote devices, such as a PC 104, a wireless device 122, or a kiosk 128. A remote device is here defined as any device connected to a network through which the device may communicate with the system's central database and which is not connected to a registered merchant's database. Such remote devices and all other remote devices which communicate with the system's central database may or may not contain BID capabilities or be connected to a peripheral with BID capabilities. Although the kiosk 128 with BID 130 is listed above as a remote device, it is envisioned but is not limited to reside in the merchant location for enrollments, pre-enrollments, account maintenance, and purchases. The kiosk 128 may be configured as a remote device or a local device depending on whether or not the registered merchant desires to integrate the kiosk into its local system.

Consumer, merchant, and employee account management may be conducted at any of the following: a consumer or business computer 104, which may or may not have an attached BID 106, and is connected to a network, which is preferably but without limitation the Internet, which is connected to the invention's central database 102; any participating merchant's customer service counter computer 114 with an attached BID 116 or any participating merchant's transaction register 118 with attached BID 120, which are both connected to the merchant database 112 which is connected to the invention's central database 102 via a network such as the Internet; one or more of a consumer's wireless devices 122, which may or may not have an attached BID 124, connected to a wireless network which is connected to a network such as the Internet connected to the invention's central database 102; or a kiosk 128 with attached BID 130 and which is attached to the invention's central database 102 via a network such as the Internet. It is envisioned that merchants who perform account management have specialized permission to do so. It is also envisioned that a portion or all of employee account management may be conducted by the merchant or the employee.

Figure 2:
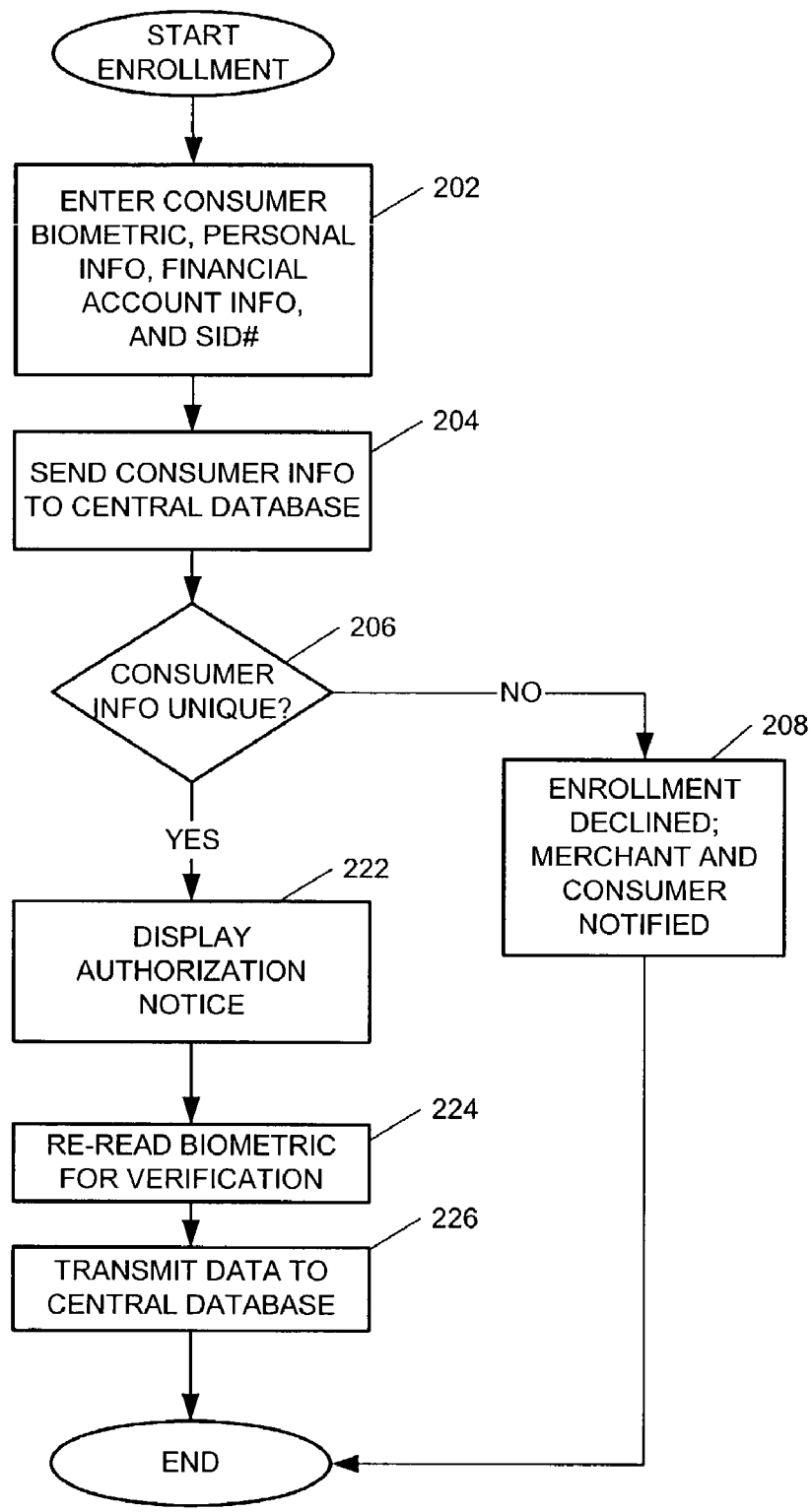
FIG. 2 illustrates a flowchart of a process for consumer enrollment into the biometric authorizations for financial transaction system according to an embodiment of the present invention.

Referring to FIG. 2, a flowchart of a consumer's enrollment process according to an embodiment of the present invention is illustrated. A consumer begins enrollment. The consumer is prompted to provide personal information, a SID number, a biometric sample, and one or more financial account 202.

By way of illustration and not as a limitation, the personal information provided during the enrollment may simply be driver's license data read from a magnetic stripe or bar code or may include a social security number, address, phone number, or any other information about the enrolling consumer. Said personal information may be swiped, scanned, hand keyed, or entered by another means by the consumer or the merchant. Information might also be captured in a digital image scan of the token or tokens which provides the consumer's personal information.

The consumer's biometric sample is entered via a biometric scanner. This sample is then translated to and stored in template form. Template forms of scanned biometrics are generally used for biometric comparisons. In an additional embodiment, the digital scan of the biometric is itself also stored in the central database. Such an embodiment that also stores the biometric digital scan is useful for reasons such as, but without limitation, biometric matching purposes, security procedures (in the case of an individual attempting to fraudulently access the system), or information protection in the event database information is lost or templates need to be re-constructed due to hardware revisions.

The system may optionally be configured to allow a consumer to register more than one type of biometric sample or two or more of the same type of biometric during enrollment. For example, the invention's system may be configured to accept a fingerprint biometric along with a face scan biometric, or the system may be configured to allow the consumer to register finger scans from more than one finger. Storing a biometric template in the consumer's system account that includes data from more than one biometric sample type enables that consumer the convenience of presenting any one of the consumer's previously scanned biometrics for account access authorization and/or funds transfer within the system of the invention.

Financial account information is entered via magnetic stripe read, hand keying, or another input method. Checking account information is entered by a magnetic ink character recognition (MICR) read, an optical character recognition (OCR) read, hand keying, or entered by another method of input. The method of information input is also recorded for each enrollment. In an alternate embodiment, the system is configured to take a digital image of the monetary-representative token the consumer normally uses to access the presented financial account and store this digital scan in the consumer's system account.

The SID is a number used to help identify individuals enrolled in the invention's system. A SID is not equivalent to a PIN used for financial ATM and debit transactions. Rather, a SID simplifies the verification of the biometric sample. The SID may be a unique number (a number with no chance of being honestly duplicated, e.g., a social security number), reasonably unique number (a number with a statistically small chance of being duplicated), or non-unique number (a number with a large chance of being duplicated). While a SID comprising a unique number will inherently provide more security, the present invention is not so limited.

In another embodiment, a secondary ID number is utilized in the event that an individual does not remember the SID. In this embodiment, the secondary ID number is any number the consumer registered during enrollment, such as, but not limited to, a home phone number, work phone number, social security number, or driver's license number.

Continuing with the enrollment process, after all consumer data is entered, all data entered is transmitted to the central database 204. The consumer's data is compared to data already registered in central database 204 for uniqueness 206. This re-enrollment check enables the system to prevent multiple enrollments from the same consumer and helps alert the system to potentially fraudulent enrollments. In checking for re-enrollment, central database 204 searches data contained therein to verify that one or more parts of the enrolling consumer's data is not enrolled in the system of the invention. If the enrolling consumer's data is not found in the enrolled accounts in the system, the enrollment process continues 222.

If the enrolling consumer's data is found in the central database 204 and the account where the duplicate information is found is not marked as a pre-enrollment account, the enrollment is automatically declined by central database 204. In another embodiment of the present invention, the merchant decides whether to accept or decline the enrollment. In this embodiment, the process further comprises displaying to the merchant the field(s) or entire account(s) wherein those duplicate fields are held. This enables the merchant to decide whether or not to accept an enrollment where only select information is duplicated, such as a phone number or address. Also, in this embodiment, a merchant is permitted to set parameters that would automatically accept or decline an enrollment based on the merchant's selected criteria.

If the enrollment is declined 208, whether it is declined by the database, the merchant, or merchant pre-set parameters, the enroller is given the opportunity to call the system's customer service. As illustrated in FIG. 2, this contact is immediately available at the point of enrollment.

If the enrolling consumer's data is not found in any of the databases within the system's central database, the enrollment continues by displaying an authorization notice 222. Once authorized by the consumer, this authorization gives any enrolled merchant permission to access the consumer's financial accounts associated with the consumer subject to verification of the consumer's identity by matching the consumer's SID and at least one biometric identifier with consumer's registered data. The following illustrates one form of such an authorization message:

"I authorize the central database authority to electronically access my accounts for financial purposes upon presentation of my biological identicators or account management purposes upon presentation of my biological identicators or selected password over the Internet or via a wireless communication device."

The consumer is prompted to re-enter at least one earlier entered biometric sample 224 to verify that they agree with the authorization notice and to authorize future transactions. The biometrically authorized authorization notice and all account information remaining in the local device are transmitted to the invention's central database 226 and recorded in the database.

Figure 3:
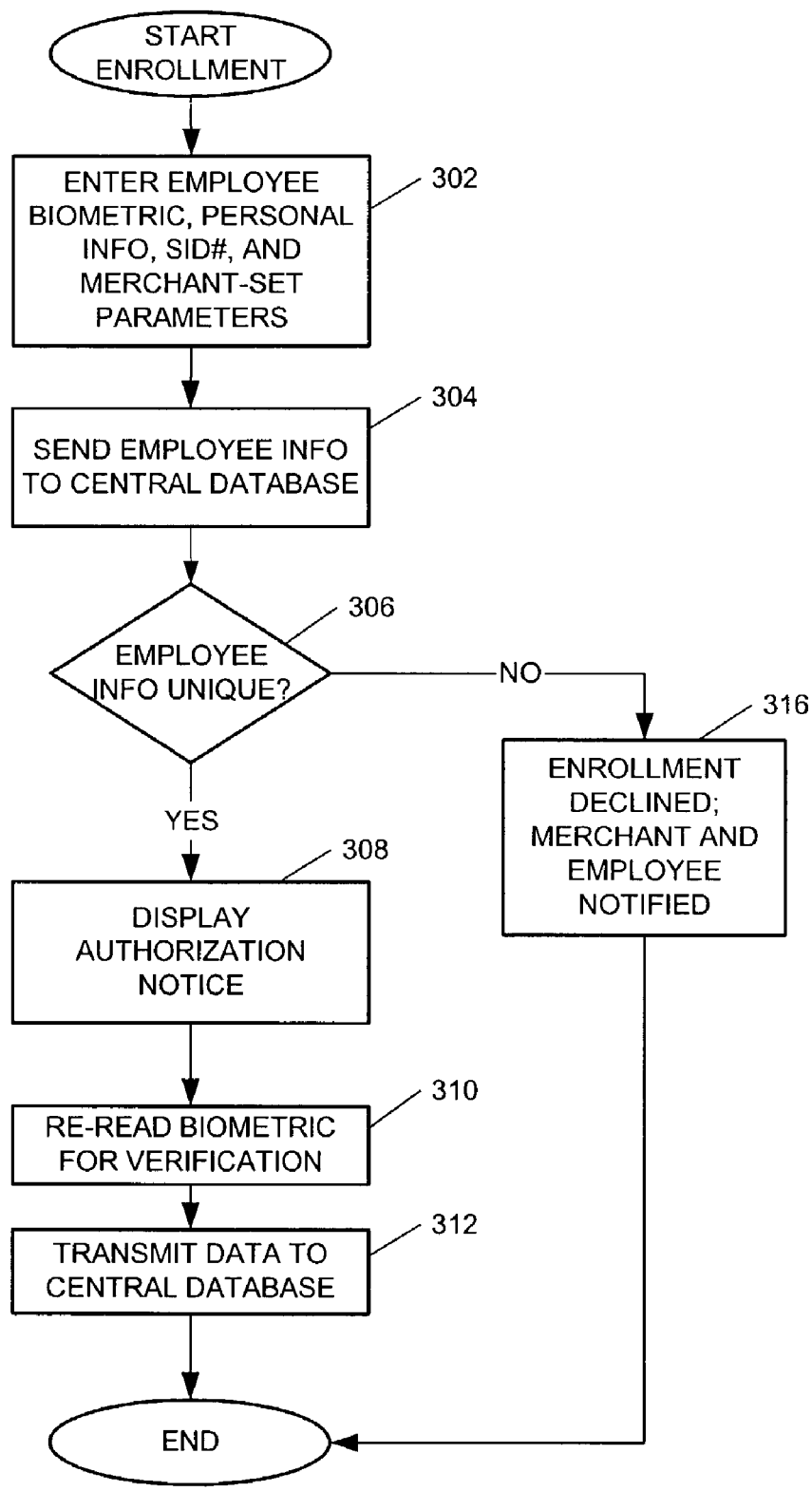
FIG. 3 illustrates a flowchart of a merchant employee enrollment in the biometric authorization for financial transactions system according to an embodiment of the present invention.

Referring to FIG. 3, a flowchart of a method of employee enrollment into the invention's system according to an embodiment of the present invention is illustrated. This enrollment is for tracking employee transaction activity within the system and may be used for security purposes. The employee enters the employee's biometric and SID 302. The employee's personal information, employee information, and merchant-set parameters are also entered 302. The employee information is sent to the invention's central database 304 where it is compared to other employee information for uniqueness 306. If the employee's information is unique, the local device will display an authorization notice outlining the responsibilities and parameters the merchant has selected to assign to them 308. The employee then re-inputs the employee's biometric 310 for verification that the employee understands his or her responsibilities within the invention's system. The employee's information is sent to the invention's central database 312 where it is recorded.

Figure 4:
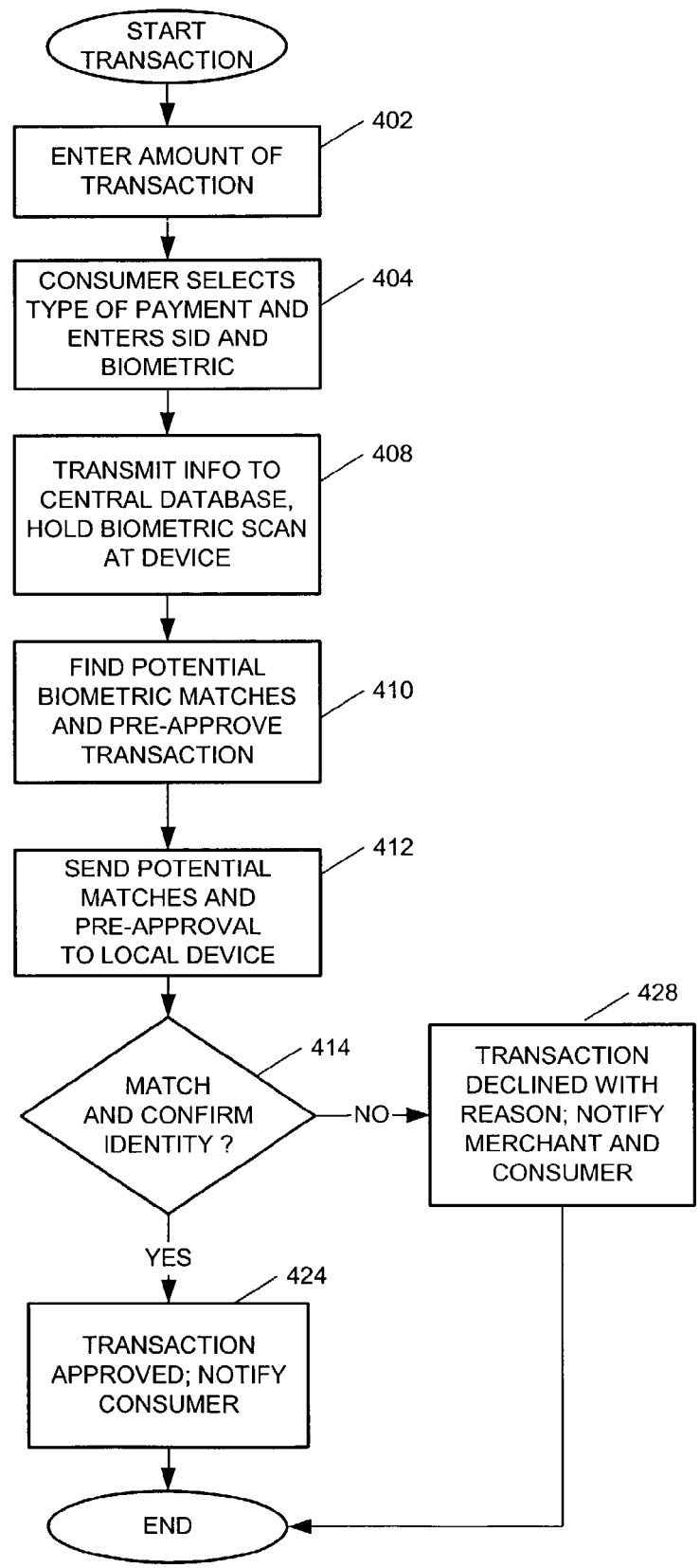
FIG. 4 illustrates a flowchart of a process for a one-transmission transaction with an account selection option using a biometric authorization for financial transactions system according to an embodiment of the present invention.

Referring to FIG. 4, a flowchart of a one-transmission transaction with account selection according to an embodiment of the present invention is illustrated. The transaction begins with the consumer selecting to use the system via a local device. The consumer selects to use the invention's services to pay for a purchase by selecting the invention's designated "key" on a keypad or selecting the invention's designated logo or other visual representation on a digital display. The transaction amount is entered 402. The consumer selects the type of financial account to be used for the purchase and enters the SID and biometric 404 (herein referred to as the "consumer transaction biometric). In an alternate embodiment the consumer may select to pay for the purchase with more than one account by selecting multiple accounts at the account selection prompt.

The type of account the consumer chooses may be any account that they have previously registered with the invention's central database before the time of purchase. In an embodiment of the present invention, the display comprises any Checking 1, Visa 1, Visa 2, American Express 1, American Express 2, and American Express 3. This embodiment of the display consists of an alphanumeric display consisting of two parts: 1) the alpha, which indicates the type of account represented, and 2) the numeric. In an alternate embodiment, the numeric further designates the priority of the account or the frequent use of the account. For example, the consumer may have registered a Visa account upon enrollment. This being the first Visa account registered in the system, the account would be automatically labeled in the system as Visa 1. However, if the consumer registers an additional Visa account, the system will automatically mark the second account as Visa 2. The consumer might later have the option of marking the second registered Visa account as the Visa account of choice within the system and thus make it Visa 1 while the previously registered Visa account would be labeled Visa 2. In this embodiment, the default function of the numeric character is to represent order of enrollment per account subject to reassignment by the consumer.

After the consumer makes an account selection, the consumer's transaction biometric is held at the local device while the remaining transaction information is sent to the invention's central database 408. In an alternate embodiment, the system is configured to send only select information to the central database. The central database uses the transaction information to find registered biometrics that are potential matches to the consumer's transaction biometric 410. The transaction is also checked against system pre-approval parameters used to help the system determine whether or not the transaction should be approved. In another embodiment, the system checks the transaction against merchant pre-set parameters, which merchants may set through account maintenance.

All information obtained from the central database is returned to the local device 412. The potential matches are compared to the consumer's transaction biometric 414. If a positive biometric match is made, the transaction is automatically approved 424. If no biometric match is made, if the transaction biometric is matched with an account marked negative, or if the pre-approval parameters are not met, the transaction is declined 428 and the merchant and consumer are notified.

If the consumer's transaction biometric is matched to a biometric linked to either an account marked warning or negative the transaction is declined. Optionally, the system may be configured to allow merchants to choose whether to approve or decline the transaction. If the system is configured to allow the merchant to approve or decline a transaction resulting from such a match, the merchant may either manually select to accept or decline the transaction or the merchant may set pre-approval parameters that would automatically approve or decline the transaction.

Where the merchant is empowered to choose to accept or decline a transaction, the local device may also be configured to display a warning message, a warning message containing a reason the transaction might have been declined by a central authority, or a warning message with a reason for potential decline and other information about the consumer's system account. Such information might provide the merchant with information upon which to base a transaction decision.

Once an approval or decline has been made, the local device informs the consumer of the transaction results via digital display or printed receipt. The system may also be configured to print or display to the consumer a reason that the transaction was declined and a phone number to a service center to call for further explanation.

The system may additionally be configured to allow consumers to request cash back from the merchant. If the system is configured to allow cash back, the cash back process, although it is integrated into a transaction already in progress, is considered a separate transaction that is approved or declined separately from the transaction already in progress. In one embodiment, the cash back option automatically begins after either the transaction amount is entered 402 or the consumer selects the type of financial account to be used to make a purchase and enters the consumer's SID and biometric 404. However, in another embodiment, the consumer requests cash back by selecting a specific button on the local device or picture on the display of the local device. In the automatic embodiment, the local device asks the consumer if they would like cash back from the merchant. If the consumer selects to not receive cash back, the transaction continues as normal. If the consumer selects to receive cash back, they are prompted to enter the amount of cash back they desire or select an amount from a list of amounts displayed by the local device. Once a cash back amount is entered, the transaction is marked as a cash back transaction and the transaction continues as usual. Once the transaction information is sent to the system's central database, this mark signals the central database to verify that the selected accounts of the potential biometric matches allow cash back. If an account is verified as allowing cash back, its linked biometric is flagged. This flag signals to the local device that the cash back is approved if the consumer's transaction biometric is matched to a flagged biometric. Additionally, the cash back option may be regulated by system or merchant pre-set parameters. The cash back option would proceed similarly in the consumer-activated cash back option.

Figure 5:
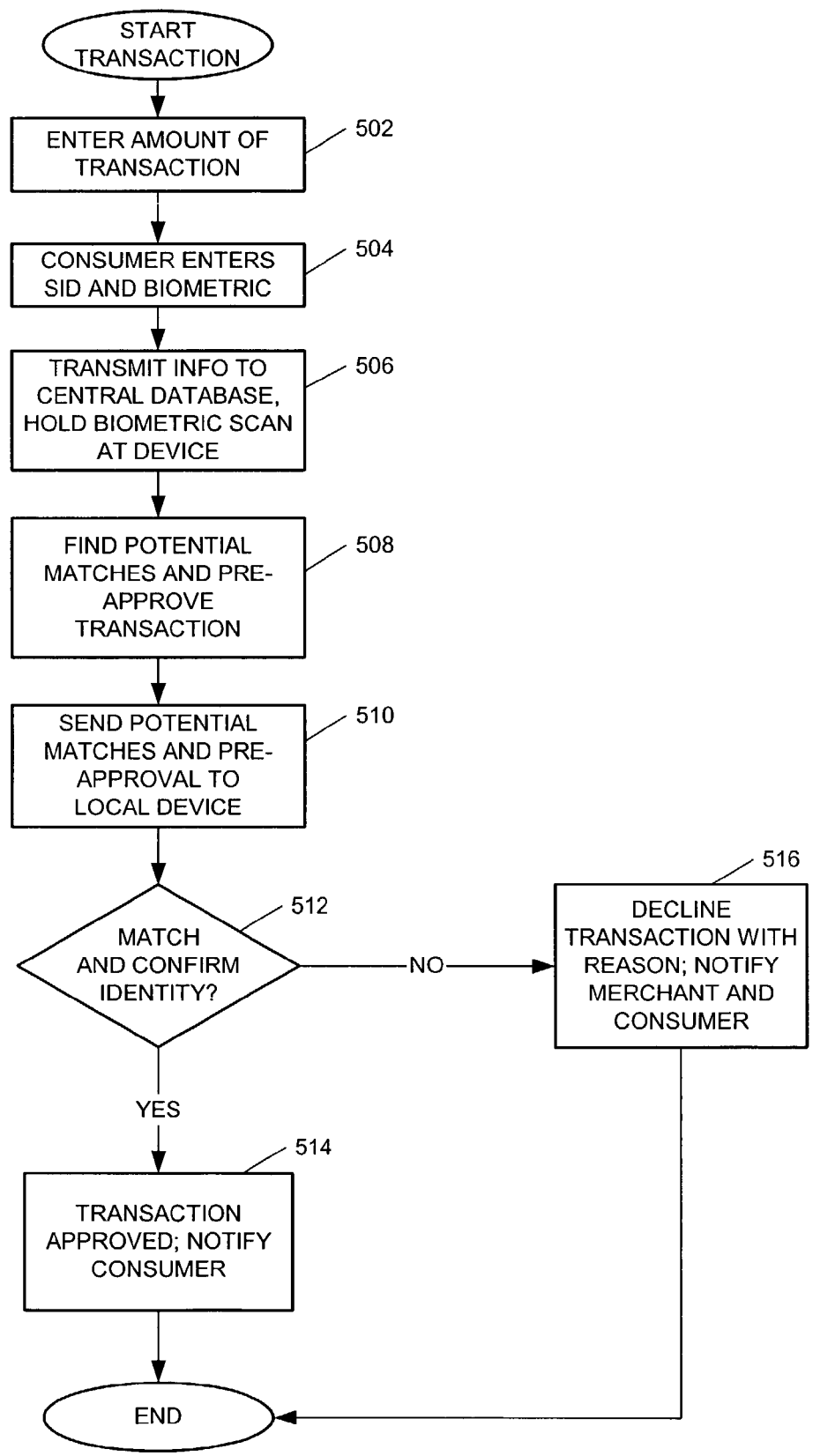
FIG. 5 illustrates a flowchart of a one-transmission transaction with account auto selection in the biometric authorization for financial transactions system according to an embodiment of the present invention.

Referring to FIG. 5, a one-transmission transaction with account auto selection according to an embodiment of the present invention is illustrated. This transaction allows a consumer who only has one financial account registered with the system or has set a preferred account to proceed with the transaction without selecting which account they would like to use. Therefore, account selection information is not sent to the central database along with the transaction information. The transaction information is entered 502. The consumer enters the consumer's SID and biometric 504. The local device runs the cash back option if the system is configured to do so. All transaction information except for the consumer's transaction biometric is transmitted to the central database 506. In an alternate embodiment, the system may be configured to send only select information to the central database. The central database finds potential biometric matches for the consumer's transaction biometric 508. Additionally, if the system is configured to allow cash back and the consumer has indicated they would like cash back from the merchant, the central database flags the potentially matching biometrics that are linked to financial accounts that allow cash back. The central database sends the potential matches and a transaction pre-approval to the local device 510. The local device determines whether or not any of the potential biometric matches match the consumer's biometric 512. If the consumer's identity is verified the transaction is approved and the consumer and merchant are notified 514. Additionally, if the consumer requested cash back from the merchant, the local device determines if the matching biometric is flagged. If the biometric is flagged, the cash back request is fulfilled and the device notifies the merchant of how much cash the system has approved giving the consumer.

If the consumer's identity is not verified or the consumer is negatively identified, the transaction will be declined with a reason and the merchant and consumer will be notified 516. Optionally, the merchant may decide to accept or decline the transaction if a negative identification has been made.

Figure 6:
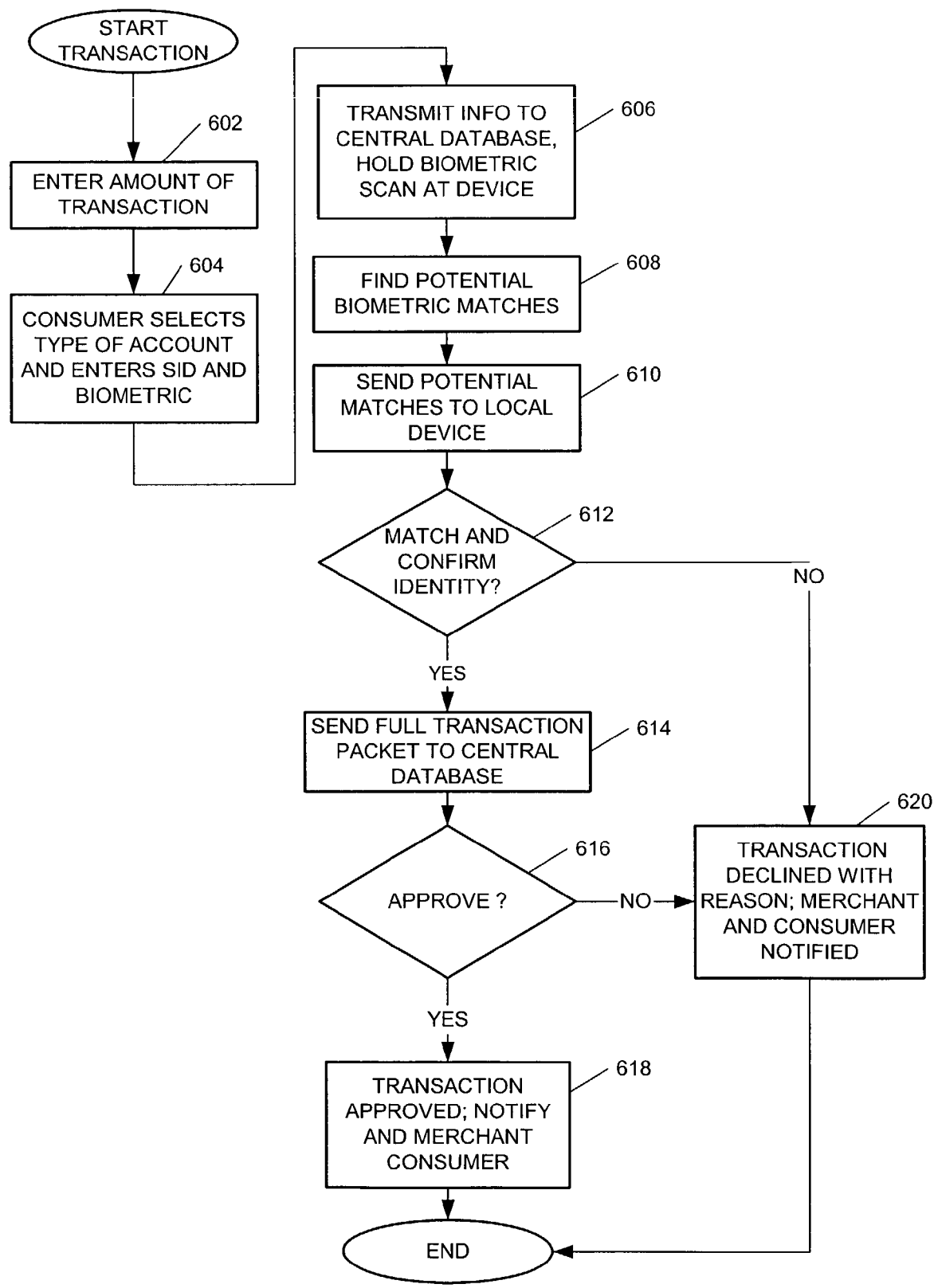
FIG. 6 illustrates a flowchart of a two-transmission transaction with account selection option in a biometric authorization for financial transactions system according to an embodiment of the present invention.

Referring to FIG. 6, a two-transmission transaction with account selection according to an embodiment of the present invention is illustrated. The transaction amount is entered 602 and the consumer selects the type of account to be used to make a purchase and enters the consumer's SID and biometric 604. In an alternate embodiment the consumer may select to pay for the purchase with more than one account by selecting multiple accounts at the account selection prompt. The transaction information is sent to the invention's central database to search for potential biometric matches to the consumer's transaction biometric 606. In an alternate embodiment, the system may be configured to send only select information to the central database. The central database finds potential matches 608. If the system is configured to allow cash back and the consumer has indicated they would like cash back from the merchant, the central database flags the potentially matching biometrics that are linked to financial accounts that allow cash back. The potential matches are returned to the local device 610. The local device compares those potential matches with the consumer's transaction biometric 612. If a positive match is found, the full transaction packet is sent to the central database 614. In an alternate embodiment, the consumer is permitted to request cash back prior to transmission of the full transaction packet if the consumer did not already do so.

The central database determines whether or not the transaction should be approved or declined 616. In one embodiment, prior to approving or declining a transaction, the central database communicates with the financial institution that houses the consumer's selected account. In another embodiment, the central database communicates with a financial database that holds credit scoring on the consumer. In yet another embodiment, the central database communicates with other financial databases to obtain financial information about the consumer relevant to determining whether or not the consumer has sufficient funds to cover the transaction. In still another embodiment, the central database simply evaluates the transaction based upon system, merchant, and/or consumer parameters.

If the transaction is approved, the merchant and consumer are notified 618. If the consumer requested cash back during the transaction and were approved for the cash back amount selected, the merchant is notified of the amount of cash back. If the transaction is declined, notice is sent to the local device 620, along with a reason the transaction was declined. Optionally, the merchant may decide to accept or decline the transaction if a negative identification has been made.

Figure 7:
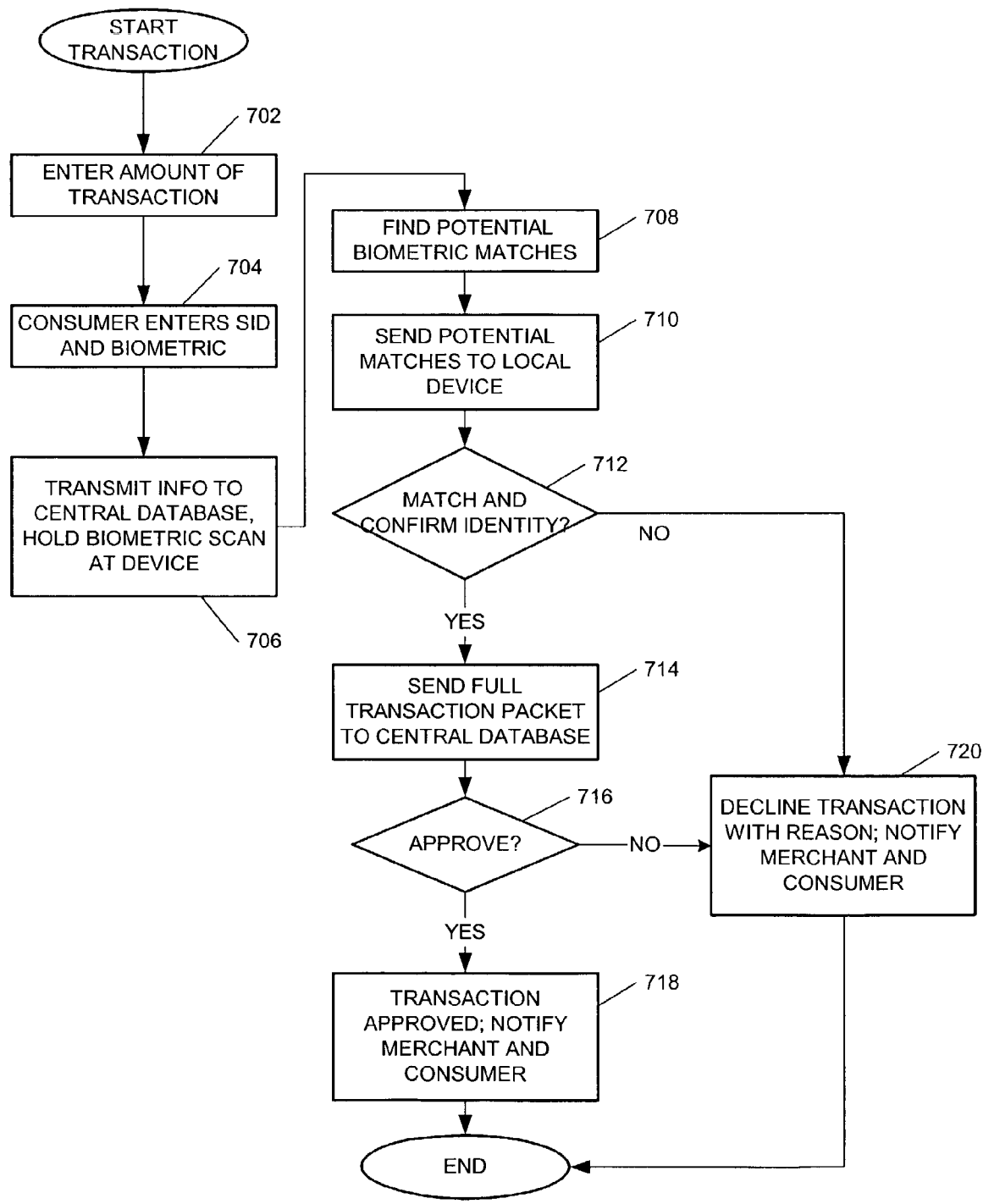
FIG. 7 illustrates a flowchart of a two-transmission transaction with account auto selection in a biometric authorization for financial transactions system according to an embodiment of the present invention.

Referring to FIG. 7, a two-transmission transaction with account auto selection according to an embodiment of the present invention is illustrated. The transaction amount is entered 702. The consumer enters the SID and biometric 704. Transaction information other than the consumer's transaction biometric is transmitted to the invention's central database 706. In an alternate embodiment, the system may be configured to send only select information to the central database. The central database finds potential biometric matches for the consumer's transaction biometric 708, and if the cash back option was selected by the consumer, the central database flags biometrics that are linked to financial accounts that allow cash back. All potential biometric matches are sent to the local device 710. The local device determines whether or not a match between the potential biometric matches and the consumer's transaction biometric can be made 712. The local device sends the full transaction packet to the central database 714. As with the two-transmission transaction with account selection (illustrated in FIG. 6), the central database determines whether or not the transaction is approved or denied 716. (See the description of various exemplary embodiments relating to transaction approval in reference to FIG. 6.). If the transaction is approved 718, the merchant and consumer are notified and the merchant is notified of the cash back amount if applicable. If the transaction is denied 720, the merchant and consumer are notified and given a reason for the declined transaction. Optionally, the merchant may decide to accept or decline the transaction if a negative identification has been made.

Figure 8:
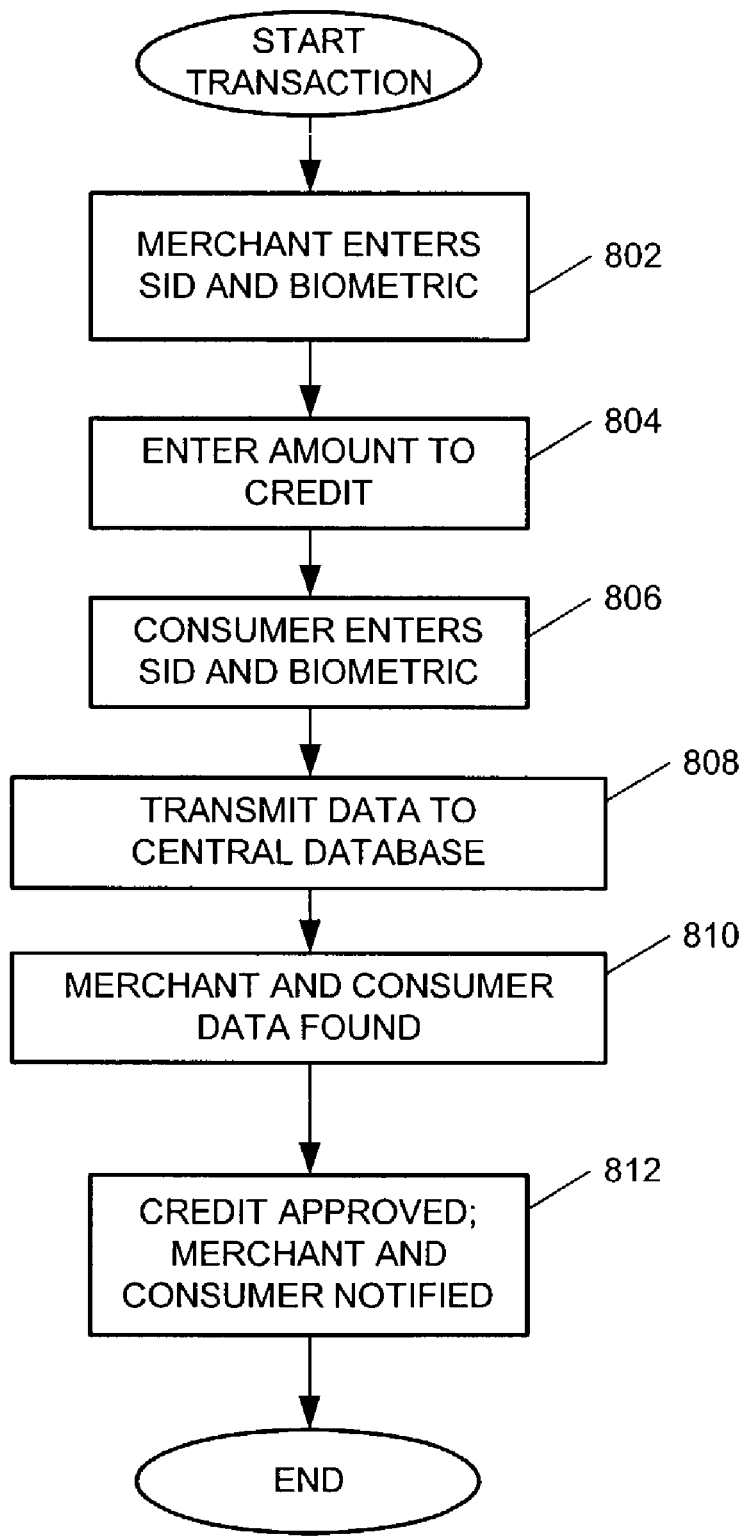
FIG. 8 illustrates a flowchart of a credit transaction in the biometric authorization for financial transactions system according to an embodiment of the present invention.

Referring to FIG. 8, a flowchart of a credit transaction according to an embodiment of the present invention is illustrated. The merchant enters the SID and biometric 802. The credit amount is entered 804. The consumer enters the SID and biometric 806. In an alternate embodiment, the number of the transaction being credited is also entered. All data entered is transmitted to the invention's central database 808. If the central database identifies the merchant and consumer 810, and optionally the transaction number, the credit is approved and the merchant and consumer are notified 814. If either of the party's identities is not verified, the transaction may result in any of the following: an automatic transaction decline, a system ID re-entry loop, or a merchant manual or automatic approval or decline. If the consumer is negatively identified, the transaction might be automatically declined with a reason and the merchant and consumer would be notified of the decline and reason for the decline. In addition, if the consumer is negatively identified, the merchant might opt to decide whether or not to approve the transaction. The merchant might then manually accept or decline the transaction or its pre-set parameters might automatically accept or decline the transaction for them. An additional embodiment of the credit transaction comprises the merchant information being evaluated in the local database. Such an embodiment would allow the local device to communicate a smaller set of transaction information to the central database. Yet a further embodiment of the credit transaction comprises the merchant conducting the transaction without entering the merchant biometric and SID.

Figure 9:
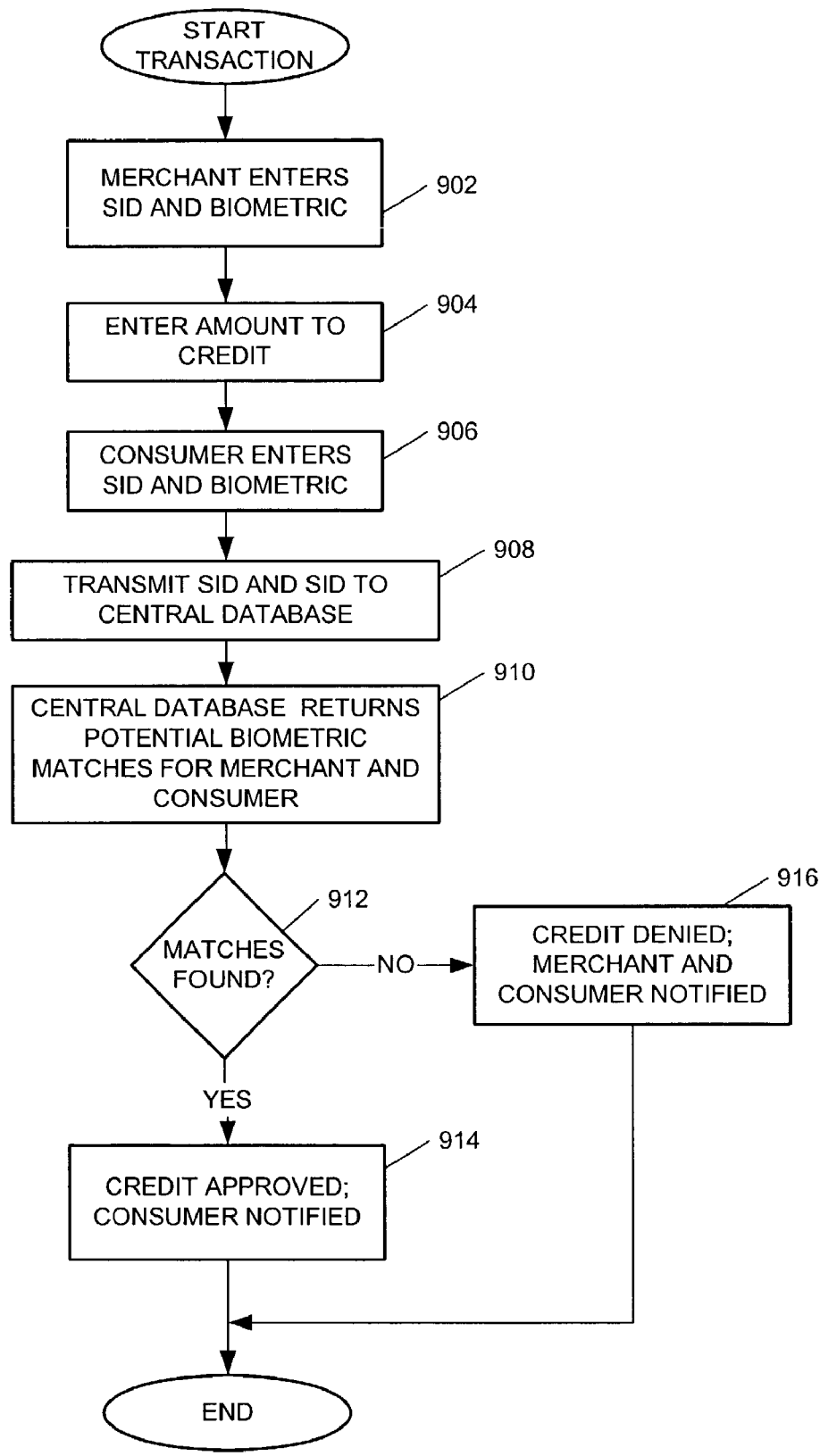
FIG. 9 illustrates a flowchart of a credit transaction with biometric matching at the local device in a biometric authorization for financial transactions system according to an embodiment of the present invention.

Referring to FIG. 9 a credit transaction with local matching according to an embodiment of the present invention is illustrated. A merchant enters the SID and biometric 902. The credit amount is entered 904. Optionally, if credits are limited to transactions previously run, the transaction number is entered into the local device. The consumer enters the SID and biometric 906. The merchant's SID and consumer's SID are transmitted to the central database 908. The central database returns potential biometric matches for the merchant's and consumer's transaction biometrics 910. The local device determines whether or not said matches can be found 912. If matches are found, the credit is approved and the merchant and consumer are notified 914. If matches are not found, the credit is denied and the merchant and consumer are notified 916. In an additional embodiment, the credit transaction with local matching comprises the merchant conducting the transaction without entering the merchant biometric and SID.

Figure 10:
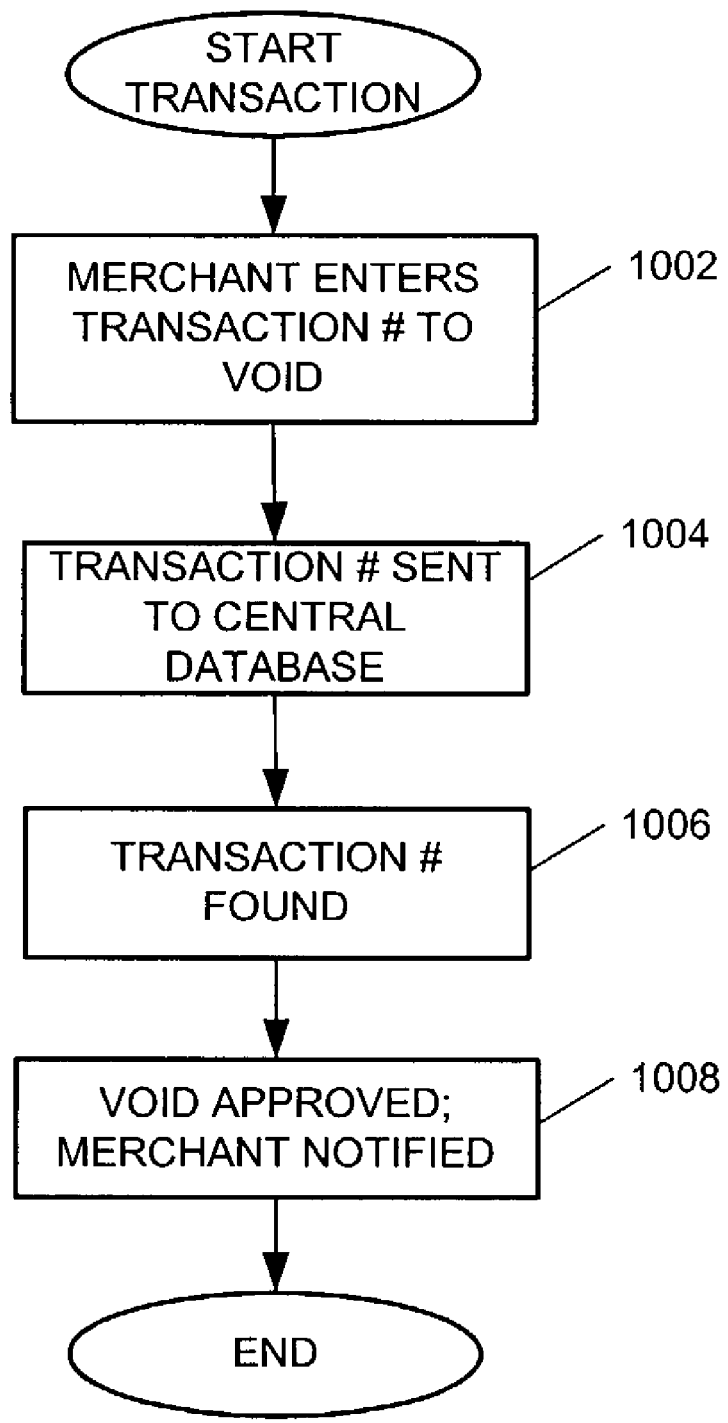
FIG. 10 illustrates a flowchart of a void transaction in the biometric authorization for financial transactions system according to an embodiment of the present invention.

Referring to FIG. 10, a flowchart of a void transaction according to an embodiment of the present invention is illustrated. The merchant enters the transaction number to void 1002. The transaction information is sent to the invention's central database 1004. The invention's central database finds the transaction number 1006. If a match is found, the void is approved and notice is sent to the local device 1008 where the merchant is notified. If no transaction number match is found, the void is denied and notice is sent to the local device. In another embodiment, the void transaction comprises the merchant entering the merchant's biometric and SID. In another embodiment, the merchant's biometric is matched in the central database. In yet another embodiment, the merchant's SID is used to find potential biometric matches that the central database returns to the local device where a match is found.

Figure 11:
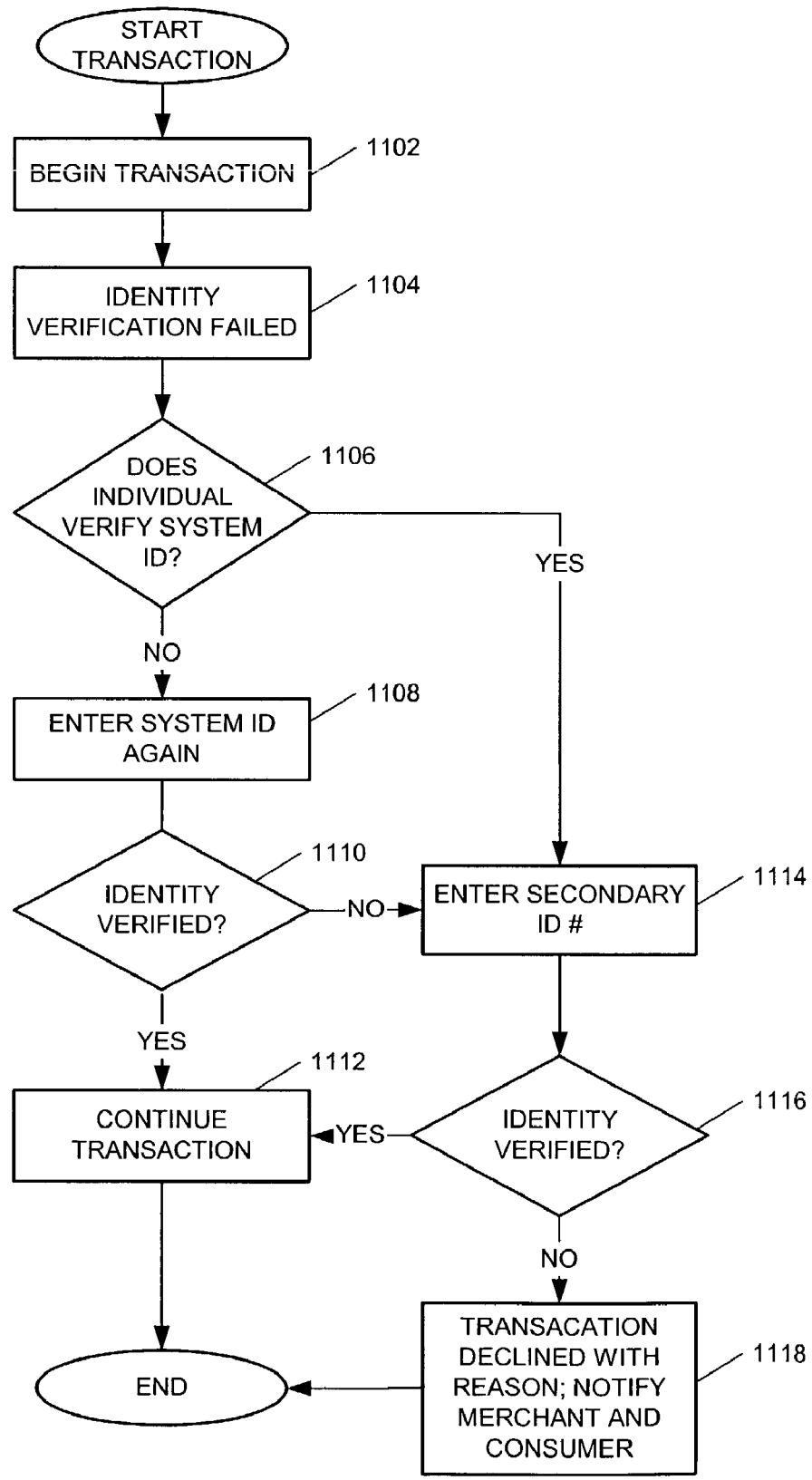
FIG. 11 illustrates a flowchart of a system ID re-entry or optional secondary ID input loop that may be performed during a transaction or account access in a biometric authorization for financial transactions system according to an embodiment of the present invention.

Referring to FIG. 11, a flow chart of a system ID re-entry loop according to an embodiment of the present invention is illustrated. In an embodiment of the present invention, an SID re-entry loop is performed after any transaction or account access identification failure 1104, meaning no identification of the presented party (whomever is attempting to access an account, i.e. consumer, employee, or merchant), positive or negative, was made. The local device will display the SID the party entered, and the party will be prompted to verify that the SID displayed is the SID they intended to enter 1106. If the party verifies that the SID displayed is correct, the device will prompt the party to enter a secondary ID number 1114. The party will then enter a secondary ID number (as previously described). The secondary ID number is sent to the invention's central database to attempt party identity verification again 1116. If verification based on the secondary ID fails, the transaction is declined with a reason and the merchant and party are notified 1118.

If the party does not verify the SID the device displays, the party will be prompted to enter the correct SID 1108. The new SID is sent to the central database. If verification fails again, the party will be prompted to enter a secondary ID number 1114. If the secondary ID number helps provide an identifying match, the transaction continues for approval 1112. If the secondary ID number does not help provide a correct match, the transaction is declined with a reason 1118, and the party is notified.

Figure 12:
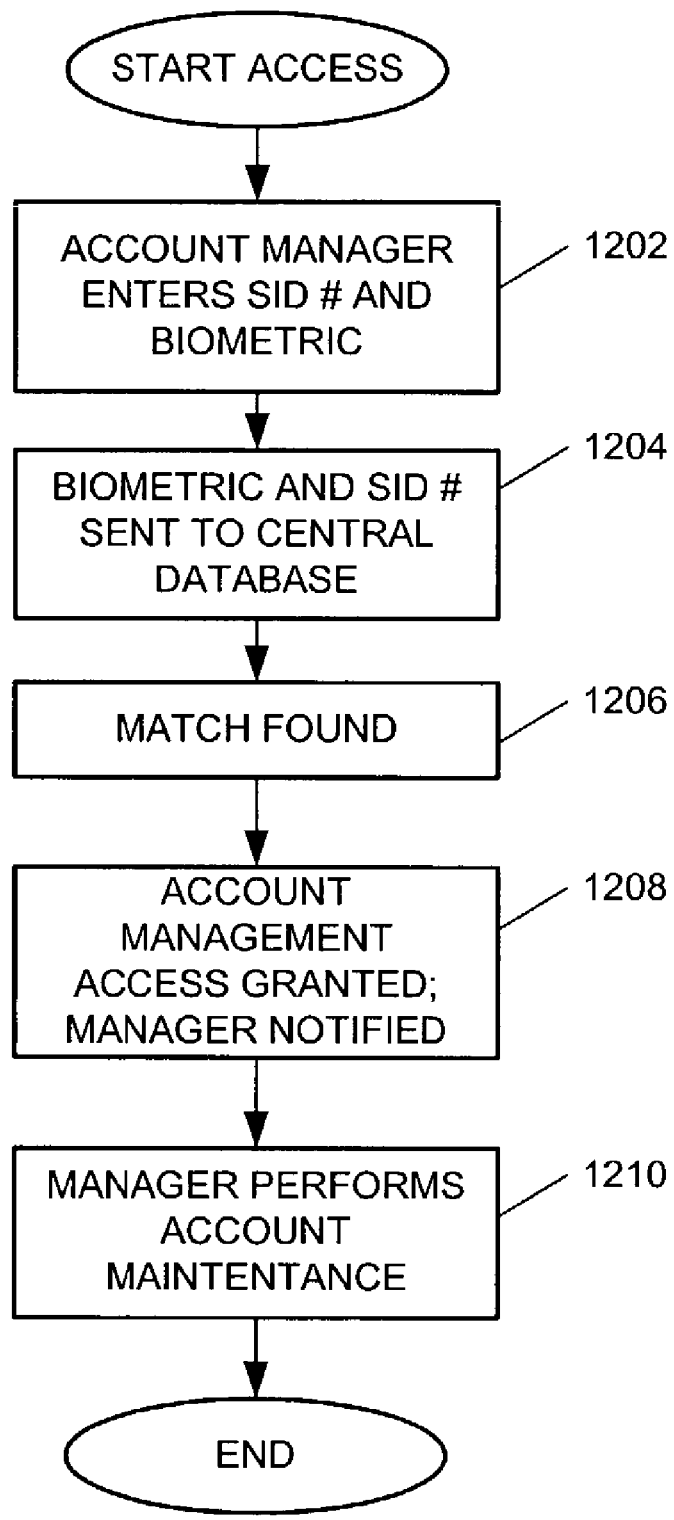
FIG. 12 illustrates a flowchart of a consumer account access with a biometric read for management purposes in a biometric authorization for financial transactions system according to an embodiment of the present invention.

Referring to FIG. 12, a flowchart of an account management access method with use of a device connected to a biometric reader according to an embodiment of the present invention is illustrated. This embodiment permits consumers, merchants, and employees to perform account management of accounts held at the central database. In an alternate embodiment, merchants may limit their employees to certain areas of the merchant's accounts or may not allow employees to perform maintenance on the merchant's accounts at all. In an yet another embodiment, an employee is permitted to perform maintenance on a merchant account, only upon entry of both the employee's access data (biometric plus SID or password plus SID) and the merchant's access data (biometric plus SID or password plus SID). The system may also be configured so that the merchant may access an employee's account without the employee's permission.

In account maintenance, the account manager—whomever is performing account management, such as the consumer, the employee, or the merchant—enters the SID and biometric 1202. The local device sends the SID and biometric to the central database 1204. The central database searches for a match to the manager's entered information 1206 for identity verification purposes. If the manager is identified, the manager is allowed to access accounts for management purposes 1208, and the manager performs account maintenance 1210. If the central database is unable to match the manager's SID and biometric, the account management access is denied. The system may also be configured to regulate account access according to certain parameters. Additionally, the time an account access remains idle may be regulated by a time-out feature. For example, if a merchant is performing account maintenance and walks away from the account maintenance machine for a few minutes, the system will automatically log the merchant out to prevent bystanders from accessing the merchant's account.

Although the drawings of this application and the corresponding detailed descriptions mainly describe merchants as the enrollment and transaction operators of the system, it is envisioned that merchant employees will also operate enrollment and transaction functions within the system. The system may be configured to allow all merchant employees who are registered in the system to perform enrollment and transaction functions. Additionally, the system may be configured to allow merchants to set their merchant employees' function allowances within the system, by pre-setting employee function parameters during employee enrollment or employee account maintenance.

Additionally, it is envisioned that all transactions and functions within the system allow for various types of transactions and functions to be performed that are credit card related such as but not limited to pre-authorization, authorization, post-authorization, terminal settlement, and host settlement.

Following is a description of various additional embodiments and methods of the system.

In an alternate embodiment, consumers may also set pre-set parameters that help the system determine whether or not a transaction should be approved. Such pre-set parameters may include but are not limited to consumers setting a limit on how much may be spent out of a specific account, regulating the merchant and/or geometric region in which an account may be accessed, and also allowing other consumers to use a system account to pay for purchases. For further detail of how a consumer might allow other users to access an account see commonly assigned application Ser. No. 09/765,789, filed by Tim Robinson on Jan. 19, 2001. The Ser. No. 09/765,789 application is incorporated by reference herein, in its entirety, for all purposes.

According to a hybrid embodiment, the system of the invention may optionally include enrollment, purchase, or cash withdrawal functions at non-conventional POS sites, provided those sites are equipped with the proper system equipment. Non-conventional POS sites might include but are not limited to PCs; ATMs; wireless devices; specially equipped payphones; self-checkout POS register stations where multiple registers are monitored by one merchant and where a consumer physically processes the consumer's transactions; unattended, automated cash registers such as those that exist in most gas pumps; vending machines; or any other automated and/or non-traditional POS site.

According to an additional hybrid embodiment, the system might allow consumers to choose whether to enroll into the system without providing any financial account information. If a consumer enrolls financial account information, the consumer may use the entirety of the system. However, if a consumer chooses to not enter any financial account information, they may use the system for non-financial transactions such as but not limited to identity verification, age verification, or a reward/loyalty type system a merchant might connect to the system.

It is also an additional embodiment of the present invention for accounts enrolled at a specific merchant to be recorded and stored on the merchant's local database before the information is transmitted to and stored on the invention's central database. Such storage would be for information back up and could be used for transaction matching purposes for consumers who enrolled with said merchant's devices in the event that the system's central database is unavailable for information access. In such an embodiment, the merchant's equipment might also be configured to communicate directly with the local database at any one or all of the transmission or reception steps within the enrollment or transaction processes instead of communicating with the system's central database. This embodiment would comprise the merchant later connecting with the invention's central database to update newly enrolled accounts within said central database and to authorize money transfers from transactions logged earlier in the day.

An additional embodiment of the invention comprises encrypting information transferred between two points in the system. For purposes of example and without limitation, transaction information may be encrypted at one point and sent across a non-secure connection between the points or not encrypted at a point of communication but sent to the other point of communication across a secure connection. Encryption and decryption of said messages may be monitored by services provided by a company such as VeriSign. As an added level of security, one alternate embodiment encrypts even information internal to a terminal and which is never transmitted in a communication. This prevents retrieval of sensitive information (e.g., data corresponding to a biometric scan) from a stolen terminal.

An additional feature of the present invention comprises an individual enrolling in the system of the invention the ability to register a password that in conjunction with a SID would allow the individual to perform account maintenance of a system account over the Internet from a remote device.

Another embodiment of the invention comprises the central database providing consumers and employees with SID suggestions if the entered SID is already registered within the system. These suggested SIDs are envisioned as SIDs that are not already registered in the system but are similar to the SID the consumer or employee originally entered.

According to another hybrid embodiment, the system might be configured to ask that the merchant supervising the consumer enrollment and/or transactions input the merchant's biometric for employee tracking and/or verification purposes.

An additional feature of the system allows direct transition from an enrollment into a POS transaction without starting a new transaction. This would allow a consumer to enroll into the system just before they purchase an item and then begin purchasing the item without having to reenter the consumer's biometric and SID.

According to another hybrid embodiment, all or select enrollments, transactions, and account access methods may additionally comprise printing a paper receipt of the system activity performed during the system access. Information included on this receipt may be any information pertinent to the transaction type, including but not limited to date, transaction number, account used, the invention's customer service phone number, instructions on how to contact the invention's customer service, merchant info, or other transaction information.

In an additional embodiment, the order in which information is entered need not be definite. For example, a consumer may be prompted to enter identifying information before the transaction amount is entered or the consumer may enter a biometric before entering a SID.

It is also an alternate embodiment of the present invention to provide merchants with consumer and employer profile reports in case of suspected fraudulent activity. These reports may be customized to display selected information from an employee's or consumer's account history or record.

According to another hybrid embodiment, the system may be configured to send the local device's TID along with transaction information for consumer security purposes. If the TID is not registered with the invention's central database, the consumer's information is not processed. Optionally, the local device display may give the consumer a system customer service number to call and a transaction code to reference during the call, so they may find out why the transaction was declined.

In an additional embodiment, the system may also comprise an age-verification feature. This feature would allow merchants to verify a consumer's age if that consumer is attempting to purchase age-regulated items, such as cigarettes or alcohol. This feature may be combined with the consumer using the system to pay for the purchase containing the age-regulated items or may be a function separate from the purchase, in the event that the consumer is registered with the system but would prefer paying for a purchase with an alternate form of payment, such as cash, certificate(s), or a credit card the consumer has not yet registered with the system. For the age verification access without financial account access, the consumer would simply be prompted to enter the consumer's biometric and SID into the system for age verification.

It is also an alternate embodiment to provide merchants with a transaction re-add function in the case that a transaction is inadvertently voided. Current credit card financial procedures completely erase a transaction once that transaction has been voided and force merchants who need to re-add a mistakenly voided transaction to create a new transaction by either re-swiping the consumer's card (if the consumer is still present) or manually entering the consumer's credit card number into a keypad. Since the system of the current invention does not authorize credit transactions by account numbers but does so by biometrics, an alternative method of correcting an inadvertent void must be introduced. A transaction re-add function would enable merchants and authorized merchant employees to easily re-add voided transactions into the system upon need. Such a function might be enabled by the authorized function operator pressing a button on the local device or by selecting the function from an electronic display. This function might also comprise the authorized function operator to provide biometric and/or a SID in order to access the function.

In a hybrid embodiment of the invention, the system might offer a merchant manager functions menu. Such a menu might be accessed by managers with access privilege noted in the merchant's system accounts. The menu might be accessed by the manager pressing a button or selecting a menu representative image on a system integrated terminal display and by presenting a scan of the manager's biometric. Once the system has verified the manager's identity and verified that they are allowed access to the merchant menu, the system will allow the manager to select various functions from the manager functions menu. Such functions might include but are not limited to conducting a credit or sale without a consumer biometric, performing a re-add void, or performing a force transaction, wherein the manager forces the system to accept a transaction that the system declined.

In an alternate embodiment, consumer system accounts may be associated with a financial score which may include scoring gathered from existing credit scoring databases or may include scoring generated by the consumer's history within the system of the invention. This score may then be used as a pre-approval parameter.

In an additional embodiment of the two transmission transactions, the transaction might be assigned a reference number to speed transaction processing when the second transmission is sent to the central database.

In an additional hybrid embodiment, digital images of all biometrics scanned for registration or enrollment purposes are stored in the system's central database.

A biometric identification system for financial transactions has been illustrated. It will be appreciated by those skilled in the art that the system and method of the present invention can be used to perform financial transactions without physical access devices and prevent fraud in such areas as retail sales, access to bank accounts, and financial and information transactions of many different kinds. For example, it is anticipated that the present invention will find utility in preventing unauthorized access to information stored on various types of information servers and not simply for the use in access of funds. It will thus be appreciated by those skilled in the art that other variations of the present invention will be possible without departing from the scope of the invention as disclosed.

What is claimed is:

1. A method of using a transaction system to provide approval of a transaction between a payee and a payor, the transaction system having a central database that has stored therein registered biometric data associated with the payor through a payor identification code, and at least one approval station configured to access the central database, wherein the method comprises:

sampling, at the approval station, at a first location, a biometric characteristic of the payor via a biometric identification device;

receiving, at the approval station, an identification code proffered by the payor;

sending from the approval station to the central database, at a second location remote from the first location, the identification code proffered by the payor;

comparing, at the central database, the proffered identification code to payor identification codes stored in the central database;

determining, at the central database, whether the proffered identification code matches a payor identification code stored in the central database;

in the event the proffered identification code matches a payor identification code stored in the central database, selecting, at the central databases potential matching registered biometric data based on the proffered identification code;

receiving, at the approval station, the potential matching registered biometric data from the central database;

determining, at the approval station, whether a comparison of transaction biometric data based on the sampled biometric characteristic with the potential matching registered biometric data indicates a match; and in the event that a match is indicated, approving, at the approval station, the transaction.

2. The method of using a transaction system as claimed in claim 1, wherein the payor identification code is unique.

3. The method of using a transaction system as claimed in claim 1, wherein the payor identification code is reasonably unique.

4. The method of using a transaction system as claimed in claim 1, wherein the payor identification code is not unique.

5. The method of using a transaction system as claimed in claim 1, wherein the biometric characteristic is a fingerprint of the payor.

6. The method of using a transaction system as claimed in claim 1, wherein the biometric characteristic is an iris of the payor.

7. The method of using a transaction system as claimed in claim 1, wherein the biometric characteristic is a face of the payor.

8. The method of using a transaction system as claimed in claim 1, wherein the biometric characteristic is a voice of the payor.

9. The method of using a transaction system as claimed in claim 1, wherein the biometric characteristic is a retinal of the payor.

10. The method of using a transaction system as claimed in claim 1, wherein the biometric characteristic is a hand architecture of the payor.

11. A method of using a transaction system to provide approval of a transaction between a payee and a payor, the transaction system having a central database that has stored therein registered biometric data associated with the payor through a payor identification code, and wherein the central database is configured to apply transaction rules, and at least one approval station configured to access the central database, wherein the method comprises:
- sampling, at the approval station, at a first location, a biometric characteristic of the payor via a biometric identification device;
- receiving, at the approval station, an identification code proffered by the payor;
- assembling, at the approval station, transaction data;
- sending from the approval station to the central database, at a second location remote from the first location, the identification code proffered by the payor and the transaction data;
- comparing, at the central database, the proffered identification code to payor identification codes stored in the central database;
- determining, at the central database, whether the proffered identification code matches a payor identification code stored in the central database;
- determining, at the central database, whether the transaction data complies with the transaction rules;
- selecting, at the central database, potential matching registered biometric data based on the payor identification code;
- receiving, at the approval station, the potential matching registered biometric data from the central database;
- determining, at the approval station, whether a comparison of transaction biometric data based on the sampled biometric characteristic with the potential matching registered biometric data indicates a match; and
- in the event that a match is indicated and the transaction data complies with the transaction rules, approving, at the approval station, the transaction.

12. The method of using a transaction system as claimed in claim 11, wherein the transaction data comprises an amount to be paid by the payor to the payee.

13. The method of using a transaction system as claimed in claim 12, wherein the transaction data further comprises at least one account from which the amount is to be paid.

14. The method of using a transaction system as claimed in claim 11, wherein the transaction data comprises a terminal identification number associated with the approval station.

15. The method of using a transaction system as claimed in claim 11, wherein the transaction data comprises a transaction reference number associated with the transaction.

16. The method of using a transaction system as claimed in claim 11, wherein determining, at the central database, whether the transaction data complies with the transaction rules comprises determining that a transaction does not exceed a payment amount limit.

17. The method of using a transaction system as claimed in claim 11, wherein determining, at the central database, whether the transaction data complies with the transaction rules comprises determining whether a payor meets or exceeds a minimum credit rating.

18. The method of using a transaction system as claimed in claim 11, wherein determining, at the central database, whether the transaction data complies with the transaction rules comprise determining if the transaction amount exceeds a minimum balance in an account.

19. The method of using a transaction system as claimed in claim 11, wherein determining, at the central database, whether the transaction data complies with the transaction rules further comprise determining if the transaction complies with a parameter established by a payee or a payor.

20. A method of using a transaction system to provide approval of a transaction between a payee and a payor, the transaction system having a central database that has stored therein registered payor biometric data associated with the payor through a payor identification code and registered payee biometric data associated with the payee through a payee identification code, and at least one approval station configured to access the central database, wherein the method comprises:
- sampling, at the approval station, at a first location, a payee biometric characteristic via a biometric identification device;
- receiving at the approval station a payee identification code proffered by the payee;
- sampling, at the approval station, a payor biometric characteristic via a biometric identification device;
- receiving, at the approval station, a payor identification code proffered by the payor;
- assembling, at the approval station, transaction data;
- sending from the approval station to the central database, at a second location remote from the first location, the payee identification code proffered by the payee, the payor identification code proffered by the payor and the transaction data;
- determining, at the central database, whether the proffered payee identification code matches a payee identification code stored in the central database;
- determining, at the central database, whether the proffered payor identification code matches a payor identification code stored in the central database;
- determining, at the central database, whether the transaction data complies with the transaction rules;
- in the event that the proffered payee identification code matches a payee identification code stored in the central database, the proffered payor identification code matches a payor identification code stored in the central database, and the transaction data complies with the transaction rules, selecting, at the central database, potential matching registered payee biometric data based on the payee identification code and potential payor registered biometric data based on the payor identification code;

receiving, at the approval station, the potential matching registered payee biometric data from the central database and the potential matching registered payor biometric data from the central database;

determining, at the approval station, whether a comparison of transaction payee biometric data based on the sampled payee biometric characteristic with the potential matching registered payee biometric data received from the central database indicates a payee biometric match;

determining, at the approval station, whether a comparison of transaction payor biometric data based on the sampled payor biometric characteristic with the potential matching registered payor biometric data received from the central database indicates a payor biometric match; and in the event that the payee biometric match and the payor biometric match are indicated, approving, at the approval station, the transaction.

21. A method of using a transaction system to provide approval of a transaction between a payee and a payor, the transaction system having a first database that has stored therein registered payor biometric data associated with the payor through a payor identification code, a second database that has stored therein registered payee biometric data associated with the payee through a payee identification code, and at least one approval station configured to access the first and second databases, wherein the method comprises:

sampling, at the approval station, at a first location, a payee biometric characteristic via a biometric identification device;

receiving at the approval station a payee identification code proffered by the payee;

sampling, at the approval station, a payor biometric characteristic via a biometric identification device;

receiving, at the approval station, a payor identification code proffered by the payor;

assembling, at the approval station, transaction data;

sending from the approval station to the first database, at a second location remote from the first location, the payor identification code proffered by the payor and the transaction data;

determining, at the approval station, whether the proffered payee identification code matches a payee identification code stored in the second database;

determining, at the first database, whether the proffered payor identification code matches a payor identification code stored in the first database;

determining, at the first database, whether the transaction data complies with the transaction rules;

in the event that the proffered payee identification code matches a payee identification code stored in the second database, the proffered payor identification code matches a payor identification code stored in the first database, and the transaction data complies with the transaction rules, selecting, at the first database, potential payor registered biometric data based on the payor identification code and selecting, at the second database, potential matching payee registered biometric data based on the payee identification code;

receiving, at the approval station, the potential matching registered payee biometric data from the second database;

receiving, at the approval station, the one or more potential matching payor biometric templates from the first database;

determining, at the approval station, whether a comparison of transaction payee biometric data based on the sampled payee biometric characteristic with the potential matching registered payee biometric data indicates a payee biometric match;

determining, at the approval station, whether a comparison of transaction payor biometric data based on the sampled payor biometric characteristic with the potential matching registered payor biometric data received from the first database indicates a payor biometric match;

in the event that the payee biometric match and the payor biometric match are indicated, approving, at the approval station, the transaction.

* * * * *